April 11, 1939.  J. A. ROSEMAN  2,153,876
MULTIPLE GANG TRACTOR MOWER
Filed Jan. 25, 1937  2 Sheets-Sheet 1
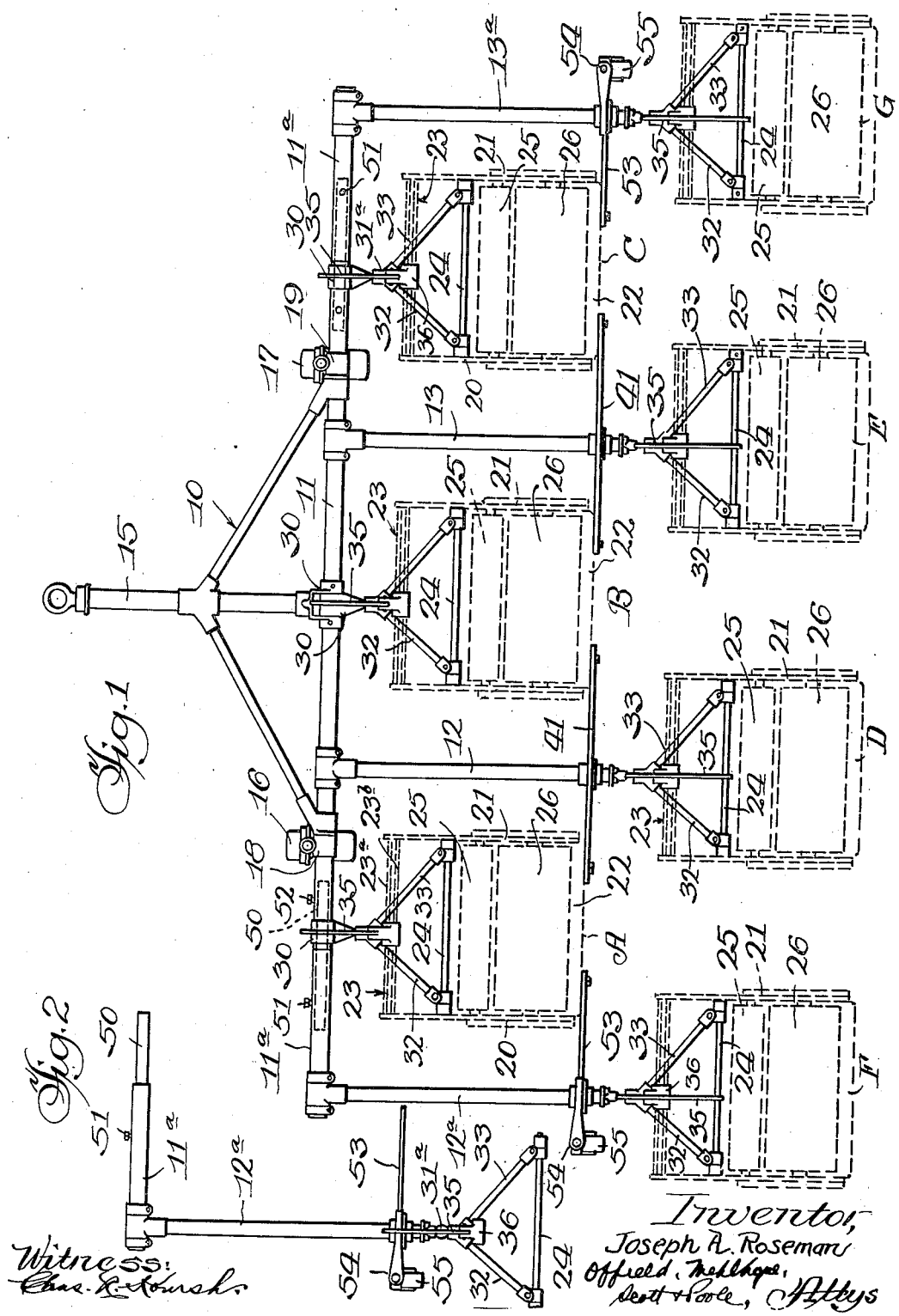

April 11, 1939. J. A. ROSEMAN 2,153,876
MULTIPLE GANG TRACTOR MOWER
Filed Jan. 25, 1937 2 Sheets-Sheet 2
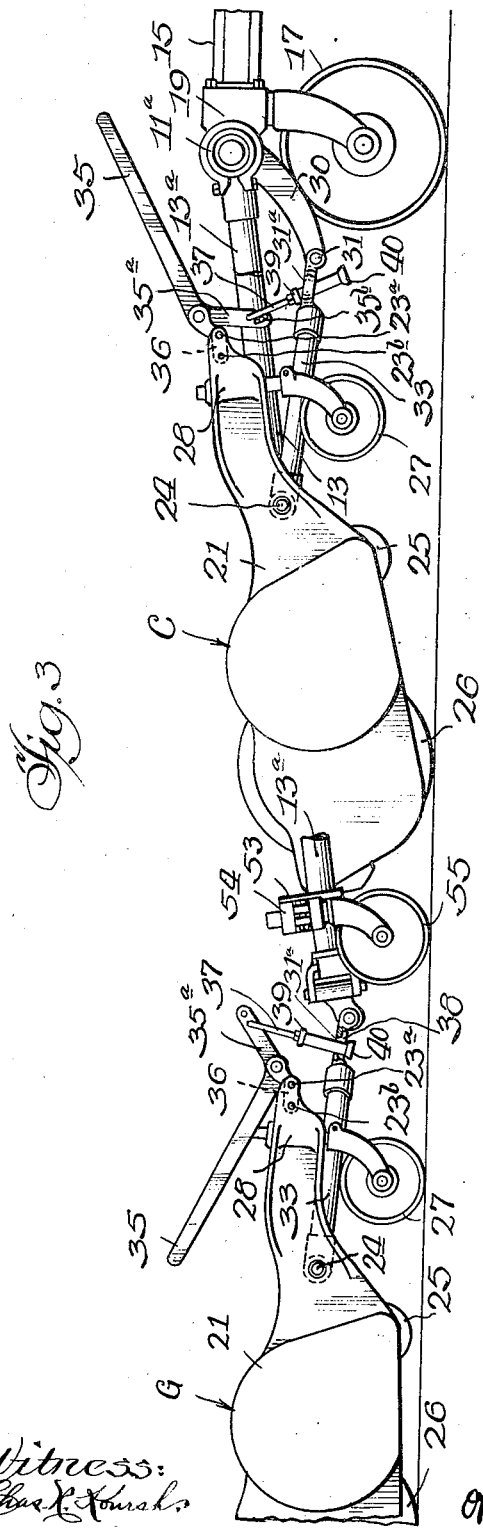
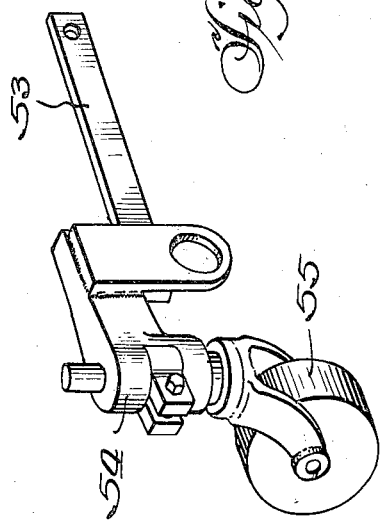
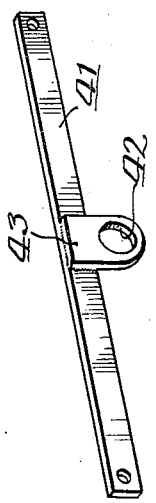
Inventor,
Joseph A. Roseman Patented Apr. 11, 1939

2,153,876

UNITED STATES PATENT OFFICE 2,153,876

MULTIPLE GANG TRACTOR MOWER

Joseph A. Roseman, Evanston, Ill.

Application January 25, 1937, Serial No. 122,146

2 Claims. (Cl. 56—7)

This invention relates to improvements in multiple gang mowing machines of the type widely used on golf links and large park areas.

One of the principal objects of the invention is to provide a simple and efficient form of hitch frame for multiple gang mowing units, having means for detachably mounting, at opposite sides thereof, two additional mowing units when it is desired to cut a wider swath.

In the embodiment of my invention herein illustrated, I utilize a form of wheeled hitch frame previously used for five mower units, in which three of said mower units are arranged in the front line and two are in trailing position in the second line, together with the vertical lift mechanism heretofore provided for elevating the cutter reels of each of the mower units out of engagement with the ground for cutting at a higher level, or for transporting the machine from place to place. In order to transform said hitch frame into a seven unit device, I provide a detachable extension for the opposite ends of the main gang bar, each having a rearwardly extending drag bar similar to the standard drag bar used for the two trailing mower units, but also provided with an auxiliary ground roller support for use in connection with the lift mechanism of its respective mower unit.

The invention may best be understood by reference to the accompanying drawings illustrating one embodiment thereof, in which Fig. 1 is a plan view of a multiple gang hitch to which two auxiliary drag bars have been added so as to transform the device from a five gang to a seven gang mower.

Fig. 2 is a detail view of one of the auxiliary drag bar attachments disconnected from the main frame.

Fig. 3 is an enlarged side view of the multiple gang hitch shown in Fig. 1 and showing a part of the auxiliary drag bar broken away, and with the lift mechanism for the front mower unit in raised position as for traveling, while the lift mechanism of the rear unit is in lowered position as for cutting.

Fig. 4 is an enlarged detail view showing a tie bar for connecting the rear ends of adjacent mower units.

Fig. 5 is a view of the auxiliary tie bar with an end supporting wheel employed in connection with my novel form of auxiliary drag bar attachment.

Referring now to details of the embodiment of my invention illustrated in the drawings, the main frame of the multiple gang hitch 10 as shown in Fig. 1 is of the type normally used for a five gang mower, that is to say, in which three mower units indicated as A, B and C are connected in transverse alignment along the main gang bar 11, and two trailing mower units D and E are connected by rearwardly extending drag bars 12 and 13 pivotally connected to said main gang bar at their front ends, and disposed respectively between the mower units A and B, and B and C, so that said trailing mower units will cut the swaths which otherwise would be left uncut in the space between the adjacent preceding mower units. This five gang hitch frame is of the type previously used, and includes a tongue 15 at the front end thereof adapted for connection to a tractor or similar draft means, and also has a pair of supporting rollers 16 and 17 of the caster type, swivelly connected in vertically disposed brackets 18 and 19, respectively, adjacent the opposite ends of the main gang bar 11.

The mower units A, B, C, D and E may be of any suitable construction usually employed with machines of this general character and need not be described in detail herein excepting to point out the principal parts thereof which are similar in each instance and comprise a main frame including side bars 20 and 21, a rear cross bar 22, and a front cross member 23. In the form shown, said front cross member consists of two members 23a, 23b which, for convenience herein, will be referred to as a single cross member. A cutter reel 25 is rotatably mounted between the side frames 20 and 21, and a main drive roller 26 is disposed rearwardly of the cutter reel to form the main support for the mower unit. Suitable drive connections (not shown) are provided between the roller 26 and the cutter reel 25, as for instance by gearing carried on one of the side frames 20. The front end of the mower unit is normally supported on the ground by a pair of caster wheels 27, 27 swivelly connected in vertically disposed brackets 28 adjacent the front end of each of the side frames 20 and 21 as shown in Fig. 3.

Referring now to the means for connecting the front mower units A, B and C to the gang bar 11, it will be seen that a bracket 30 is mounted on the gang bar and depends downwardly and rearwardly in front of each of the front mower units and is connected by a pivot pin 31 to a bracket 31a having diverging arms 32, 33 pivotally connected at their rear ends to the intermediate cross bar 24 of the mower unit.

In the form shown, it will be noted that one of the diverging arms 32 is slightly shorter than the companion arm 33, so that the line of draft is offset slightly toward one side of the mower unit. This construction has been found to be preferable in cases where the drive gearing between the traction roller 26 and the cutter reel is located on one side only of the mower unit so as to produce a slightly greater drag on the driving end of the traction roller than on the free end of the latter. This offset draft arrangement is thus used to counter-balance the uneven drag above referred to.

Means are also provided for lifting the front end of each of the mower units with respect to the ground, particularly when it is desired to change the cutting height of all the mowers to a uniformly higher level as for cutting so-called "rough," or rough heavy grass. This lifting mechanism for each mower unit includes a hand lever 35 pivoted on a bracket 36 rigidly mounted on the cross member 23 and having an arm 35$^a$ integral with said hand lever to which is connected a depending link 37 extending through an eye 38 in the bracket 31$^a$. Said link 37 has a pair of stops 39 and 40 spaced from each other so as to provide substantial vertical movement of the link 37 relative to the bracket 31$^a$.

It will be observed in Fig. 3 that the front mower unit C is shown in elevated position with its lift lever 35 thrown forwardly, whereas the rear mower unit G is shown in low cutting position, with its lift lever 35 thrown rearwardly. In ordinary operation, however, it will, of course, be understood that all of the units will be either in low cutting position or in elevated high cutting position.

Referring first to the arrangement of the lift mechanism shown in elevated position as with the front mower unit C shown in Fig. 3, it will be observed that forward movement of lever 35 thrusts the link 37 downwardly until the upper stop 39 engages the connecting bracket 31$^a$. Further swinging movement of said lever causes the entire lift mechanism and the front cross bar 23 of the unit to be elevated relative to the intermediate cross bar 24 of said unit, and thus tilt the front end of the mower unit C upwardly into the position shown, in which the unit will ride upon its traction roller 26, but with the cutter reel 25 and the front caster wheels 27 raised from the ground. The lift lever 35 may be locked in raised position by a locking pin 35$^b$ removably inserted in the arm 35$^a$.

The gang bars 12 and 13 are each supported adjacent their rear ends by means of tie bars 41, 41, which extend between the adjacent mower units A and B, and B and C, respectively, and are bolted to the respective rear frame members 22, 22 of said units, as clearly shown in Fig. 1. The bolted connections are preferably loose so as to afford limited relative movement between the several parts of the frame while following uneven ground. One of the cross bars 41 is shown in detail in Fig. 4 from which it will be seen that the drag bar 12 or 13 passes through an opening 42 in the depending bracket 43 located centrally of the said tie bar. These tie bars thus serve both to maintain the adjacent mower units in spaced relation with each other, and to support the rear end of its respective gang bar to form a reaction member for the lift mechanism associated therewith.

When the lift mechanism is in lowered position as shown in connection with the rear mower unit G shown in Fig. 3, the locking pin 35$^b$ is removed, and the control lever 35 is thrown rearwardly so as to permit the front end of the mower unit to be lowered into low cutting position with the caster wheels 27 on the ground, as shown in this figure. The mower unit is then permitted limited vertical movement relative to the bracket 31$^a$, in which the lower end of link 37 is retained by the upper and lower stops 39 and 40, respectively.

Referring now more particularly to the novel features of the present invention, I provide a pair of extension attachments shown in Fig. 2 adapted to be detachably connected at opposite ends of the main gang bar 11 so as to accommodate draw bars 12$^a$ and 13$^a$ for additional units F and G disposed in lateral alignment with the rear mower units D and E of the five gang unit. The two attachments are similar to each other, excepting that they are mutually reversed for attachment to the right and left hand sides of the frame, so that a description of one will suffice for an understanding of both.

Referring now to the auxiliary attachment shown in Fig. 2, it will be seen that a bar 11$^a$ is provided for detachable connection to the main gang bar 11 to form an extension at one end thereof. Where the gang bar 11 is in the form of a hollow tube, as shown, this connection is provided by means of a filler bar 50 having one end fixed within the tube section 11$^a$ as by means of a set screw 51, and the other end is inserted in the hollow end of the gang bar 11 and secured therein by means of a set screw 52. An auxiliary drag bar 12$^a$ similar to the drag bars 12 and 13 is connected at the outer end of the extension member 11$^a$ and has connection to the auxiliary mower unit F in the same manner that the gang bars 12 and 13 are connected to their respective mower units D and E.

It will be observed, however, that the rear end of the gang bar 12$^a$ cannot be supported on a tie bar similar to the tie bars 41, because there is no means of support for the outer end of such a tie bar. Accordingly I provide an auxiliary supporting bar 53 shown in detail in Fig. 5 which is similar to the tie bars 41, excepting that one end thereof is shorter and connected to a bracket 54 of an auxiliary caster wheel 55 which is arranged to have direct engagement with the ground. This provides the necessary support for the gang bars 12$^a$ and 13$^a$. The auxiliary mower units F and G are provided with the same type of lift mechanism previously described in connection with the standard form of mower units, including a lever 35 arranged to tilt the front ends of said mower units upwardly out of engagement with the ground at will.

From the above, it will be seen that the auxiliary extensions 12$^a$ and 13$^a$ may be readily attached or detached to transform a five gang unit into a seven gang unit when it is desired to increase the cutting width of the entire device. It will, of course, be understood that the same form of attachments can be used to add two mower units to a gang hitch having any other uneven number of units, as for instance, a three gang unit can be easily increased to a five gang unit in the same machine.

One of the principal features of the arrangement above described is that when all of the units are in low cutting position as illustrated by the rear unit G in Fig. 3, they are at all times adjusted to cut at a uniform height controlled by their respective caster wheels 27, but when all of said units are elevated for cutting at an increased height, the caster wheels are no longer in use, but still the units will be automatically adjusted and supported so that they will cut at a uniform higher level, in which the front row of units are directly supported by the main gang bar 11, and the rear units are directly supported by their respective gang bars through the tie bars supported at the rear of the front row mower units. The same, of course, applies to the mower units connected to the auxiliary extensions 12ª and 13ª which are supported in their high cutting position through tie bar 53 and auxiliary caster wheels 55. Thus all of the units can be simultaneously raised or lowered at will by their levers 35 to cut at the same level, either in low or elevated position.

It will be observed further that the adjustment of height for each of the units is provided substantially at its point of flexible connection to its respective draft member, which in the case of the front row of units are the brackets 30, and in the case of the rear mower units are the rear ends of the gang bars 12, 13, etc. Moreover, these points of connection are flexible at all times so as to permit independent vertical and horizontal swinging movement of each mower unit so as to provide a uniform height of cut of each unit, regardless of the angle it may assume relative to the ground, and regardless of whether it is in lowered or elevated cutting position.

The stops 39 and 40 on link 37 of each elevating mechanism may also be adjusted longitudinally of said link as desired, to adjust the elevation of each unit to conform with the other units, as well as to vary the cutting level of all of the units in their elevated position.

Although I have illustrated and described one particular embodiment of my invention, it will be understood that I do not wish to be limited to the exact construction shown and described, but that various changes and modifications may be made without departing from the spirit and scope of my invention as defined in the appended claims.

I claim:

1. An attachment for a multiple gang mower hitch frame having a plurality of mower units arranged in successive rows, said attachment consisting of a transversely disposed extension member having means for detachable connection at the front end of said hitch frame, and a drag bar connected to the outer end of said extension member and adapted to extend rearwardly therefrom beyond the outer side of the adjacent front row mower unit of said hitch frame to provide connection for an auxiliary mower unit disposed in the second row, and an auxiliary frame member having a ground-engaging wheel and a laterally extending tie bar having means for detachable connection with the outermost front row mower unit to provide ground support for the rear end of said drag bar.

2. An attachment for a multiple gang mower hitch frame having a plurality of mower units arranged in successive rows, said attachment consisting of a transversely disposed extension member having means for detachable connection at the front end of said hitch frame, and a drag bar connected to the outer end of said extension member and adapted to extend rearwardly therefrom beyond the outer side of the adjacent front row mower unit of said hitch frame to provide connection for an auxiliary mower unit disposed in the second row, and an auxiliary frame member having a laterally extending tie bar including means for detachable connection with the outermost front row mower unit, and a ground-engaging wheel adjacent the rear end of said drag bar to provide support for the mower unit connected to said drag bar.

JOSEPH A. ROSEMAN.